US009495206B2

(12) United States Patent
Cao et al.

(10) Patent No.: US 9,495,206 B2
(45) Date of Patent: Nov. 15, 2016

(54) SCHEDULING AND EXECUTION OF TASKS BASED ON RESOURCE AVAILABILITY

(71) Applicant: International Business Machines Corporation, Armonk, NY (US)

(72) Inventors: Zhao Cao, Beijing (CN); Ju Wei Shi, Beijing (CN); Chen Wang, Beijing (CN); Lan Jun Wang, Beijing (CN); Yu Wang, Shanghai (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 14/592,087

(22) Filed: Jan. 8, 2015

(65) Prior Publication Data
US 2015/0199216 A1 Jul. 16, 2015

(30) Foreign Application Priority Data

Jan. 10, 2014 (CN) .......................... 2014 1 0011477

(51) Int. Cl.
*G06F 9/46* (2006.01)
*G06F 15/173* (2006.01)
*G06F 9/48* (2006.01)
*G06F 9/50* (2006.01)

(52) U.S. Cl.
CPC .......... *G06F 9/4843* (2013.01); *G06F 9/5027* (2013.01); *G06F 9/5061* (2013.01)

(58) Field of Classification Search
None
See application file for complete search history.

(56) References Cited

U.S. PATENT DOCUMENTS

| 2007/0250838 | A1* | 10/2007 | Belady | G06F 11/3409 718/105 |
| 2009/0254916 | A1* | 10/2009 | Bose | G06F 17/30477 718/104 |
| 2011/0041136 | A1* | 2/2011 | Messier | G06F 9/5066 718/105 |
| 2012/0192197 | A1 | 7/2012 | Doyle et al. | |
| 2013/0031558 | A1 | 1/2013 | Balmin et al. | |
| 2013/0104140 | A1 | 4/2013 | Meng et al. | |
| 2013/0191843 | A1 | 7/2013 | Sarkar et al. | |
| 2014/0130054 | A1* | 5/2014 | Molkov | G06F 9/5072 718/104 |
| 2015/0286504 | A1 | 10/2015 | Cao et al. | |

FOREIGN PATENT DOCUMENTS

WO 2012144985 A1 10/2012

OTHER PUBLICATIONS

Muthusrinivasan, Muthuprasanna et al. "Optimizing the Update Packet Stream for Web Applications". Broadband Communications, Networks, and Systems. 7th International ICST Conference, BROADNETS 2010, Athens, Greece, Oct. 25-27, 2010.*

(Continued)

*Primary Examiner* — Adam Lee
(74) *Attorney, Agent, or Firm* — Cantor Colburn LLP; Keivan Razavi

(57) ABSTRACT

An apparatus for scheduling includes a receiving unit, configured to receive a task of a job; a configuration unit, configured to configure resource amounts for the task in at least two resource dimensions respectively, wherein each of the resource dimensions represents a resource available for configuring; and an interface unit, configured to distribute the task along with information about the resource amounts configured for the task in the resource dimensions.

6 Claims, 12 Drawing Sheets

(56) References Cited

OTHER PUBLICATIONS

Abhishek Velma, et al., "ARIA: Automatic Resource Inference and Allocation for MapReduce Environments," ICAC, ACM, Jun. 14-18, 2011, pp. 1-10.

J. Polo, et al., "Resource-aware Adaptive Scheduling for MapReduce Clusters," Proceedings of the 12th ACM/IFIP/USENIX international conference on Middleware, 2011, pp. 1-20.

Lei Shi, et al., "S3: An Efficient Shared Scan Scheduler on MapReduce Framework," IEEE International Conference on Parallel Processing, 2011, pp. 1-10.

R. Nanduri, et al., "Job Aware Scheduling Algorithm for MapReduce Framework," 3rd IEEE International Conference on Cloud Computing Technology and Science, Nov. 2011, pp. 1-7.

List of IBM Patents or Patent Applictions Treated As Related; (Appendix P), Filed Jul. 8, 2016, 2 pages.

* cited by examiner

SCHEDULING AND EXECUTION OF TASKS BASED ON RESOURCE AVAILABILITY

This application claims priority to Chinese Patent Application No. 201410011477.X, filed Jan. 10, 2014, and all the benefits accruing therefrom under 35 U.S.C. §119, the contents of which in its entirety are herein incorporated by reference.

BACKGROUND

The present invention relates to computer technology, and more specifically, to a method and apparatus of scheduling and execution of tasks in a distributed system.

In a distributed system, a job is executed by multiple node devices. A job is generally divided into multiple tasks to be executed on various nodes in parallel. Correspondingly, in general, resources on a node available for executing tasks are logically divided into a number of identical resource units (also called as "slots"), and each free resource unit can be used to execute one task.

Commonly, resource units are divided and fixed before the operation of a distributed system. However, those divided resource units may not be suitable for various different tasks to be executed. For example, the divided resource units may be "too large" for some of the tasks, causing a part of the resource unit to remain idle during the execution of these tasks, thereby lowering the resource utilization on the note.

It has been proposed to dynamically adjust the number of divided resource units (i.e., to adjust the size of resource units) according to the state of resource utilization on the note, however lag caused by this process (e.g., lag from measuring resource utilization on the note to completing the re-division of resource units) will usually deteriorate the performance of distributed systems, which can even be unacceptable for certain jobs.

SUMMARY

In one embodiment, an apparatus for scheduling includes a receiving unit, configured to receive a task of a job; a configuration unit, configured to configure resource amounts for the task in at least two resource dimensions respectively, wherein each of the resource dimensions represents a resource available for configuring; and an interface unit, configured to distribute the task along with information about the resource amounts configured for the task in the resource dimensions.

In another embodiment, a method of scheduling includes receiving a task of job; configuring resource amounts for the task in at least two resource dimensions respectively, wherein each of the resource dimensions represents a resource available for configuring; and distributing the task along with information about the resource amounts configured for the task in the resource dimensions.

In another embodiment, a method for execution includes receiving a task along with information about the resource amounts configured for the task in at least two resource dimensions respectively; assigning resources to the task in the at least two resource dimensions respectively according to the information; and executing the task by using the assigned resources.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
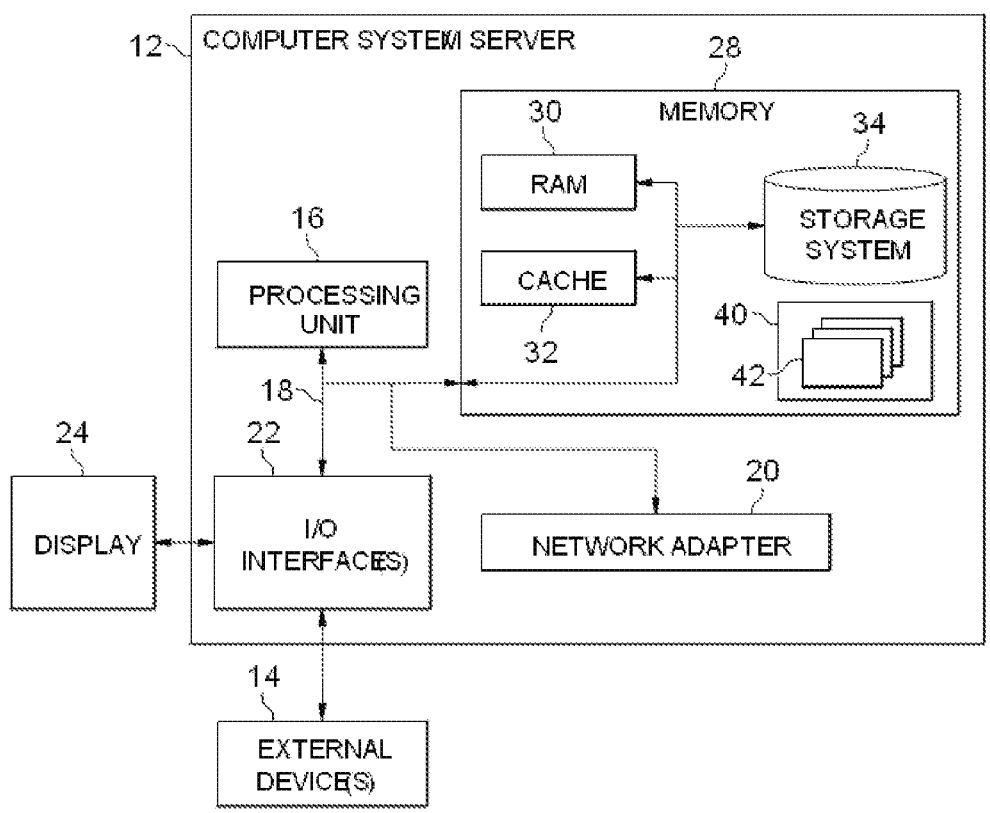
FIG. 1 shows an exemplary computer system which is applicable to implement the embodiments of the present invention.

Through configuring resource amounts for a task in at least two dimensions respectively, the aspects of this invention can improve resource utilization.

According to one aspect of the present invention, there is provided an apparatus for scheduling, which comprises a receiving unit, configured to receive a task of a job; a configuration unit, configured to configure resource amounts for the task in at least two resource dimensions respectively, wherein each of the resource dimensions represents a resource available for configuring; and an interface unit, configured to distribute the task along with information about the resource amounts configured for the task in the resource dimensions.

In one embodiment, the apparatus of scheduling further comprises an estimation unit, configured to estimate the resources amounts to be consumed by the task in the at least two resource dimensions, wherein the configuration unit configure the resource amounts for the task in at least two resource dimensions respectively according to result of the estimating.

In one embodiment, the estimation unit estimates the resources amounts to be consumed by the task in the at least two resource dimensions according to historical information.

In one embodiment, the estimation unit estimates the resources amounts to be consumed by the task in the at least two resource dimensions according to sampled information.

In one embodiment, the apparatus of scheduling further comprises a candidate unit, configured to select tasks respectively from a plurality of jobs as candidate tasks to be distributed at the interface unit.

In one embodiment, the apparatus of scheduling further comprises a generation unit, configured to generate a scheme for distributing the candidate tasks at the interface unit according to the resource amounts configured for each of the candidate tasks in the resource dimensions.

In one embodiment, the apparatus of scheduling further comprises a decision unit, configured to estimate a gain of a scheme assumed to be generated by the generation unit after a predetermined lag with respect to a scheme currently generated by the generation unit, and instruct the generation unit not to generate a scheme until the predetermined lag elapses in the case that the gain estimated is superior to the cost of the predetermined lag.

In one embodiment, the apparatus of scheduling is included in a Map device of a MapReduce device.

In one embodiment, the apparatus of scheduling is included in a Reduce device of a MapReduce device.

According to a second aspect of the present invention, there is provided a method of scheduling, which comprises receiving a task of job; configuring resource amounts for the task in at least two resource dimensions respectively, wherein each of the resource dimensions represents a resource available for configuring; and distributing the task along with information about the resource amounts configured for the task in the resource dimensions.

In one embodiment, the method of scheduling further comprises estimating the resources amounts to be consumed by the task in the at least two resource dimensions; wherein configuring resource amounts for the task in at least two resource dimensions respectively comprises configuring the resource amounts for the task in at least two resource dimensions respectively according to result of the estimating.

In one embodiment, estimating the resources amounts to be consumed by the task in the at least two resource dimensions comprises estimating the resources amounts to be consumed by the task in the at least two resource dimensions according to historical information.

In one embodiment, estimating the resources amounts to be consumed by the task in the at least two resource dimensions comprises estimating the resources amounts to be consumed by the task in the at least two resource dimensions according to sampled information.

In one embodiment, the method of scheduling further comprises selecting tasks respectively from a plurality of jobs as candidate tasks to be distributed.

In one embodiment, the method of scheduling further comprises generating a scheme for distributing the candidate tasks according to the resource amounts configured for each of the candidate tasks in the resource dimensions.

In one embodiment, the method of scheduling further comprises estimating a gain of a scheme assumed to be generated after a predetermined lag with respect to a scheme currently generated, and not generating a scheme until the predetermined lag elapses in the case that the gain estimated is superior to the cost of the predetermined lag.

In one embodiment, the method of scheduling is included in a Map process of a MapReduce process.

In one embodiment, the method of scheduling is included in a Reduce process of a MapReduce process.

According to a third aspect of the present invention, there is provided an apparatus for execution, which comprises a receiving unit, configured to receive a task along with information about the resource amounts configured for the task in at least two resource dimensions respectively; an assignment unit, configured to assign resources to the task in the at least two resource dimensions respectively according to the information; and an execution unit, configured to execute the task by using the assigned resources.

According to a fourth aspect of the present invention, there is provided a method for execution, which comprises: receiving a task along with information about the resource amounts configured for the task in at least two resource dimensions respectively; assigning resources to the task in the at least two resource dimensions respectively according to the information; and executing the task by using the assigned resources.

According to a fifth aspect of the present invention, there is provided a distributed system, which comprises: an apparatus of scheduling according to the first aspect; and an apparatus for execution according the third aspect, configured to execute tasks distributed by the apparatus of scheduling.

Exemplary embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

<Embodiment 1>

A first embodiment will be described with reference to FIG. 2 and FIG. 3.

Figure 2:
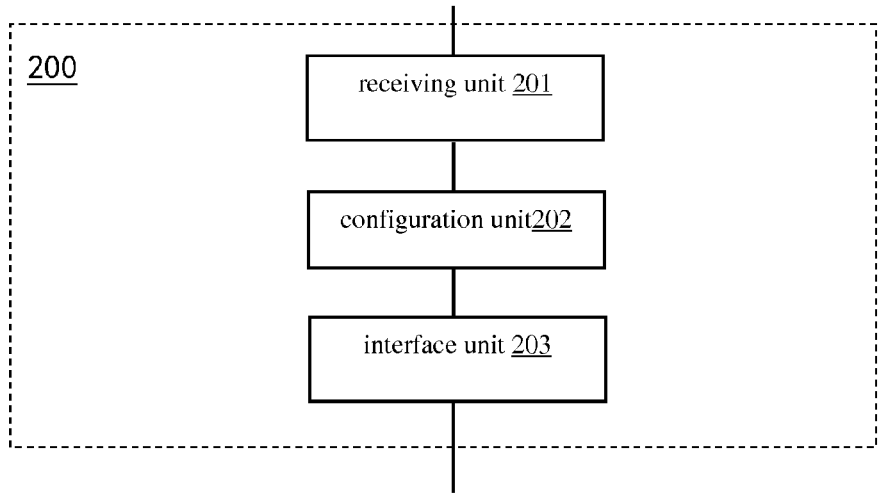
FIG. 2 shows a schematic structure diagram of an apparatus of scheduling according to a first embodiment of this invention.

FIG. 2 shows a schematic structure diagram of an apparatus 200 of scheduling according to a first embodiment of this invention, wherein the apparatus can comprise a receiving unit 201, a configuration unit 202 and an interface unit 203.

The receiving unit 201 may be configured to receive a task of a job.

The configuration unit 202 may be configured to configure resource amounts for the task in at least two resource dimensions respectively, wherein each of the resource dimensions represents a resource available for configuring.

The interface unit 203 is configured to distribute the task along with information about the resource amounts configured for the task in the resource dimensions.

Figure 3:
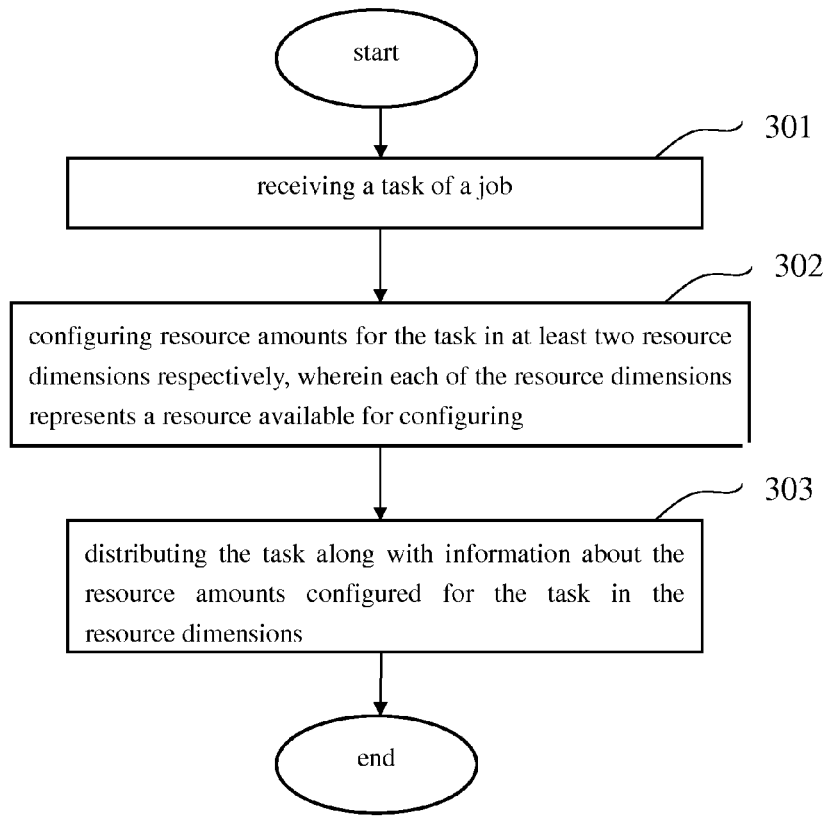
FIG. 3 shows a schematic flowchart of a method of scheduling according to a first embodiment of this invention.

FIG. 3 shows a schematic flowchart of a method of scheduling according to a first embodiment of this invention, wherein the method can comprise the following operations: an operation 301 of receiving a task of a job; a operation 302 of configuring resource amounts for the task in at least two resource dimensions respectively, wherein each of the resource dimensions represents a resource available for configuring; and an operation 303 of distributing the task along with information about the resource amounts configured for the task in the resource dimensions.

Herein, configuring resource amounts for the task in at least two resource dimensions respectively can refer to configuring resource amounts for the task respectively with respect to each of at least two kinds of resources. That is to say, the ratio between the resource amounts configured in the at least two resource dimensions may not always keep constant for various tasks.

Different from configuring resource amounts in a single dimension as in the prior art, this embodiment configures resource amounts for a task in multiple resource dimensions respectively, which enables more flexible resource amount configuration for the task, and thus will be more suitable for the resource requirements of the task, leading to improved resource utilization accordingly.

In an embodiment, configuring resource amounts for the task in at least two dimensions respectively may be embodied as dividing each of the resources available for configuration respectively into slices, the number of the slices may be uncorrelated and different between various resources, and configuring resource amounts for the task with respect to each of the resources, wherein the numbers of resource slices configured for the task may be uncorrelated and different between various resources. However, this embodiment is not limited thereto, for example, it is also possible to divide various resources into the same number of slices, and configure resource slices for the task with uncorrelated and different numbers between the various resources.

In an embodiment, resources available for configuration may comprise CPU, memory, hard disk and network resources, etc. Taking CPU and memory resources as an example, a total CPU resource amount on a node (for example, 4 cores) may be divided into 8 slices, i.e., eight CPU resource units of 0.5 core, and a total memory resource amount (e.g., 1G) may be divided into four slices, i.e., four memory resource units of 0.25G. Resource amounts configured for a high memory consumption task may be 1 CPU unit and 4 memory units; while resource amounts configured for a high CPU consumption task may be 2 CPU units and 1 memory unit.

In an embodiment, configuring resource amounts for the task may further comprise marking the task with a vector tag representing resource amounts configured in various resource dimensions. The vector tag may be in a form of {CPU_SLOT, MEM_SLOT, DISK_SLOT, NET_SLOT}, wherein CPU_SLOT, MEM_SLOT, DISK_SLOT, NET_SLOT respectively represent CPU, memory, hard disk and network resource amounts that are configured for the task. The vector tag may be distributed along with the task as information about the resource amounts configured for the task in the resource dimensions.

In an embodiment, "distribution" may comprise sending or assigning the task and the information to a node for executing the task.

<Embodiment 2>

A second embodiment will be described with reference to FIG. 4 to FIG. 9.

Figure 4:
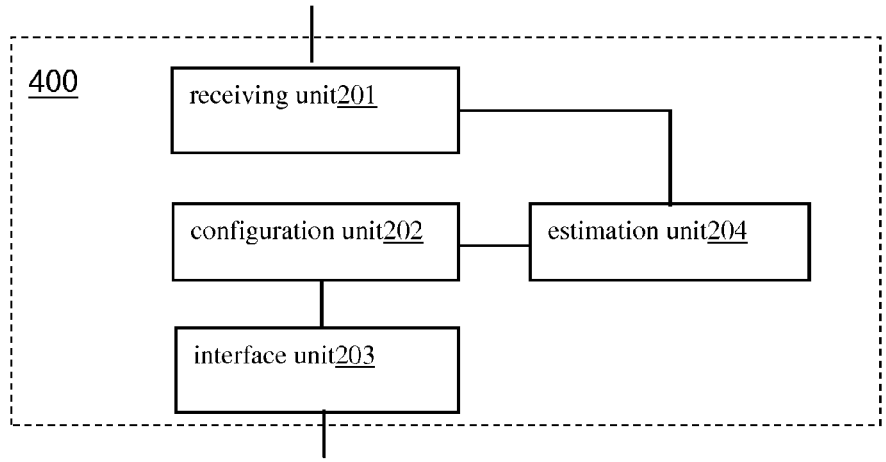
FIG. 4 shows a schematic structure diagram of an apparatus of scheduling according to a second embodiment of this invention.

FIG. 4 shows a schematic structure diagram of an apparatus 400 of scheduling according to a second embodiment of this invention, wherein on the basis of the first embodiment, the scheduling apparatus 400 further comprises an estimation unit 204, configured to estimate the resources amounts to be consumed by the task in the at least two resource dimensions. The configuration unit 202 may configure the resource amounts for the task in at least two resource dimensions respectively according to result of the estimating.

Figure 5:
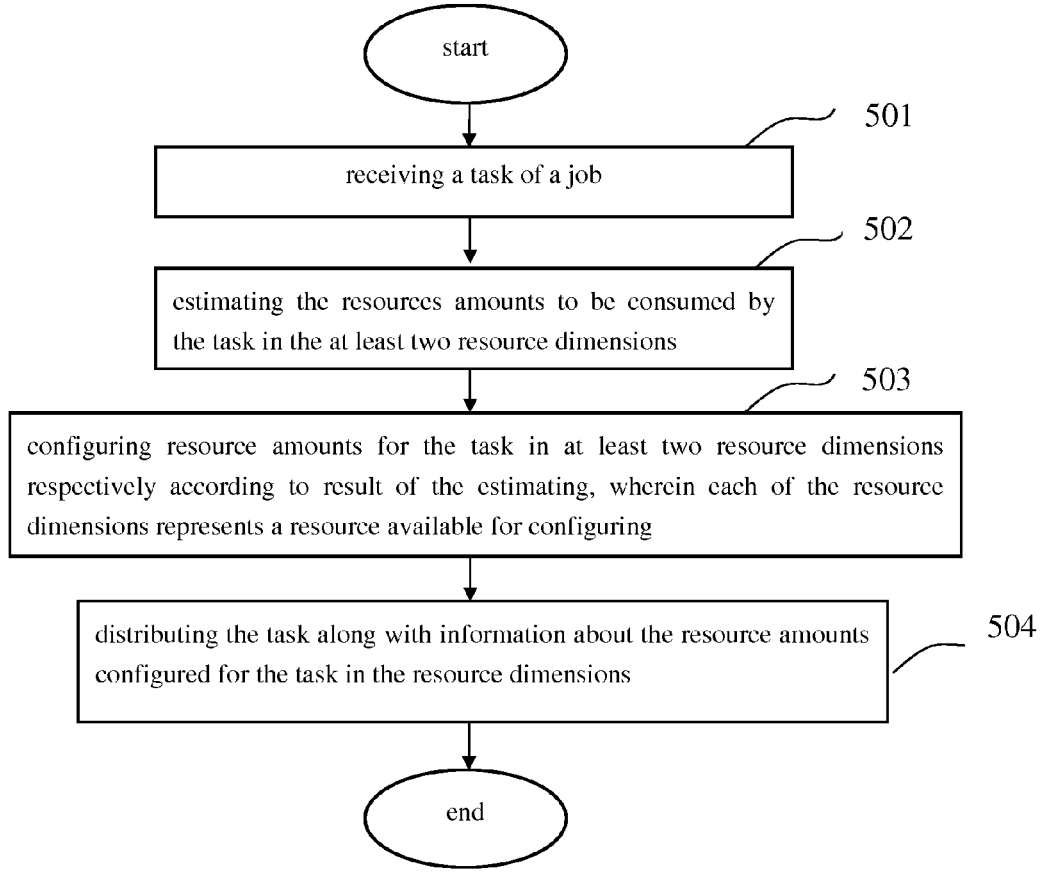
FIG. 5 shows a schematic flowchart of a method of scheduling according to a second embodiment of this invention.

FIG. 5 shows a schematic flowchart of a method of scheduling according to a second embodiment of this invention, wherein on the basis of operations 501, 503, 504 corresponding to operations 301~303 of the first embodiment, the method further comprises a operation 502 of estimating the resources amounts to be consumed by the task in the at least two resource dimensions. At operation 503, resource amounts may be configured for the task in at least two resource dimensions respectively according to result of the estimating.

Through configuring resource amounts for the task by estimating the resources amounts to be consumed by the task in the at least two resource dimensions, this embodiment may make resource amounts configured for the task more suitable for the resource requirements of the task, thereby further improve resource utilization.

In an embodiment, the resources amounts to be consumed by the task in the at least two resource dimensions may be estimated according to historical information or sampled information.

Figure 6:
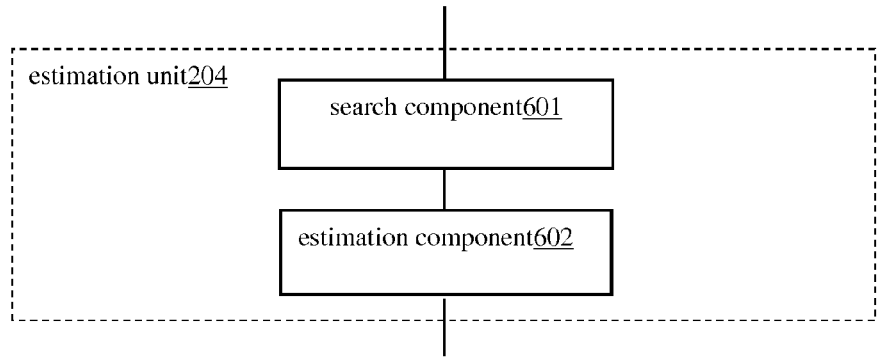
FIG. 6 shows a schematic structure diagram of an example of the estimation unit.

FIG. 6 shows a schematic structure diagram of an example of the estimation unit 204. In this example, the resource amounts to be consumed by the task in the at least two resource dimensions may be estimated according to historical information, wherein the estimation unit 204 may comprise: a search component 601 and an estimation component 602.

The search component 601 may be configured to search historical information for historical jobs associated with the current job. Historical information may comprise characteristics of a historical job and the resource amounts consumed by tasks of the historical job in various resource dimensions. In the case that all tasks of a job can be considered as homogeneous or approximately homogeneous, characteristics of the job may be used to represent characteristics the tasks of the job. The characteristics of a job may comprise a job name (which may represent logic of the job that determine consumption levels of different resources) and the data amount of the job (representing the size of the job) and any other characteristics related to the resource amounts consumed by the job. For example, "similar job name" may be used as a search condition. However, the search condition is not limited thereto, so long as historical jobs associated with the current job can be found out. Herein, "associated" can means "having similar properties in resource consumption".

The estimation component 602 may be configured to estimate the resource amounts to be consumed by the task of a current job in the various resource dimensions, according to the resource amounts consumed by tasks of an associated historical job in various resource dimensions in the historical information. The estimation may comprise, for example, computing a gain in the data amount of the current job with respect to that of an associated historical job, and multiplying resource amounts consumed by a task of the historical job by the gain to estimate that to be consumed by the task of the current job.

Figure 7:
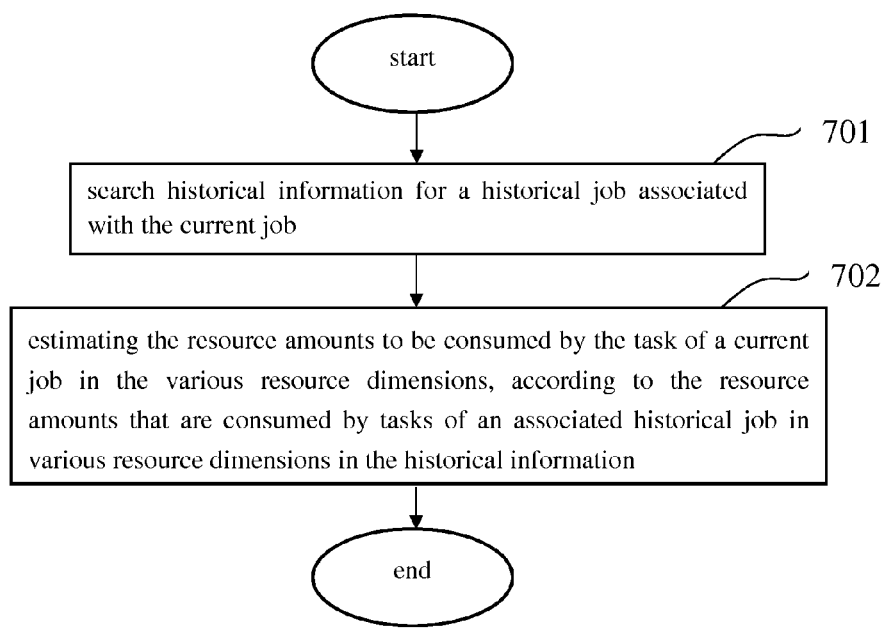
FIG. 7 shows a schematic flowchart of an example of the operation 502.

FIG. 7 shows a schematic flowchart of an example of the estimation operation 502, which may estimate the resources amounts to be consumed by the task in the at least two resource dimensions according to historical information. In this example, operation 502 may comprise the following operations: an operation 701 of search historical information for a historical job associated with the current job; and an operation 702 of estimating the resource amounts to be consumed by the task of a current job in the various resource dimensions, according to the resource amounts that are consumed by tasks of an associated historical job in various resource dimensions in the historical information.

The example shown in FIGS. 6 and 7 may make an effective estimation on the configuration of resource amounts for a task based on historical information, such that manual configuration can be avoided and efficiency can be further improved.

Figure 8:
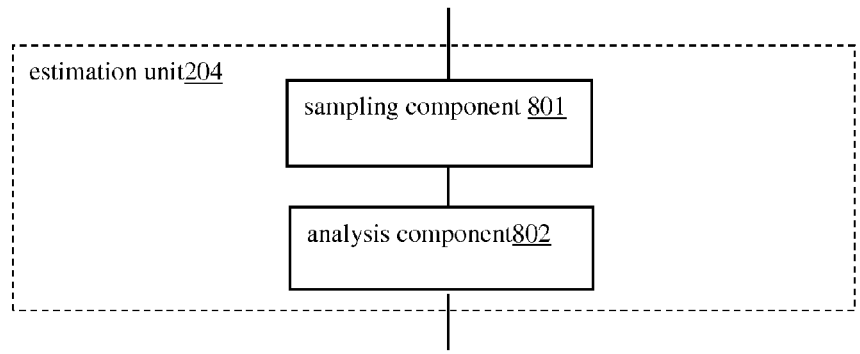
FIG. 8 shows a schematic structure diagram of another example of the estimation unit.

FIG. 8 shows a schematic structure diagram of another example of the estimation unit 204, which may estimate the resources amounts to be consumed by the task in the at least two resource dimensions according to sampled information. In this example, the estimation unit 204 may comprise a sampling component 801 and an analysis component 802.

The sampling component 801 may be configured to perform sampling for a task. "Sampling", for example, may comprise sampling on the data to be processed by the task. For example, as to a task handling an amount of data (e.g., 100G), part of the data (e.g., 100M) may be sampled for executing of the task. "Sampling" may also comprise sampling on the tasks per se, for example, as to a job having multiple tasks, some (or even only one) of the tasks may be sampled to be executed, which particularly applies to a job with homogeneous tasks. "Sampling" may also comprise a combination of the both as described above, for example, sampling on both the tasks and the data so as to further improve the efficiency of the estimation.

The analysis component 802 may be configured to analyze resource amounts consumed by a sampled task in various resource dimensions during execution, and estimate resource amounts to be consumed by the task in the various resource dimensions based on the analysis result. In an example, the analysis result may be directly provided to the configuration unit 202 as an estimation result.

Figure 9:
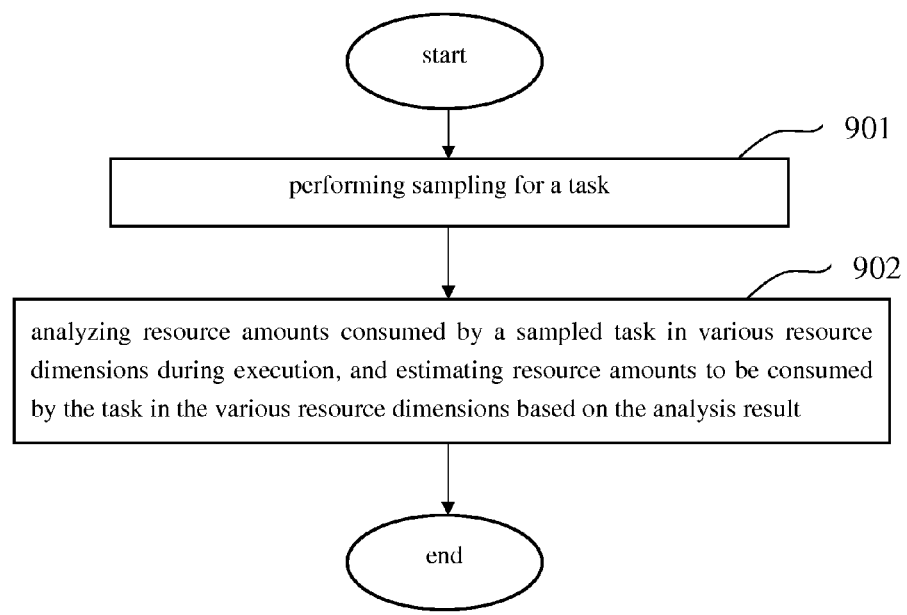
FIG. 9 shows a schematic flowchart of another example of the operation 502.

FIG. 9 shows a schematic flowchart of another example of the operation 502, which may estimate the resource amounts to be consumed by the task in the at least two resource dimensions according to sampled information. In this example, the operation 502 may comprise the following operations: an operation 901 of performing sampling for a task; and an operation 902 of analyzing resource amounts consumed by a sampled task in various resource dimensions during execution, and estimating resource amounts to be consumed by the task in the various resource dimensions based on the analysis result.

The example shown in FIGS. 8 and 9 enables an estimation of resource amounts to be consumed by a task in various resource dimensions with a smaller cost even when no historical information is available.

For an application wherein all the tasks executed are same or similar, the estimation unit 204 may be omitted and the configuration unit 202 may directly configure resource amounts for the task according to the data amount of a job or a task.

<Embodiment 3>

A third embodiment will be described with reference to FIG. 10 and FIG. 11.

Figure 10:
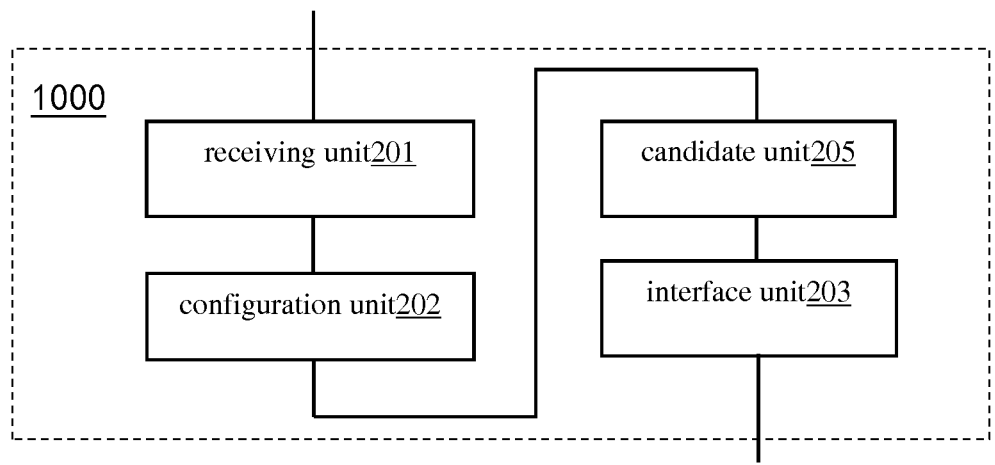
FIG. 10 shows a schematic structure diagram of an apparatus of scheduling according to a third embodiment of this invention.

FIG. 10 shows a schematic structure diagram of an apparatus 1000 of scheduling according to a third embodiment of this invention, wherein on the basis of the first embodiment, the scheduling apparatus 1000 further comprises a candidate unit 205, configured to select tasks respectively from a plurality of jobs as candidate tasks to be distributed at the interface unit 203.

Figure 11:
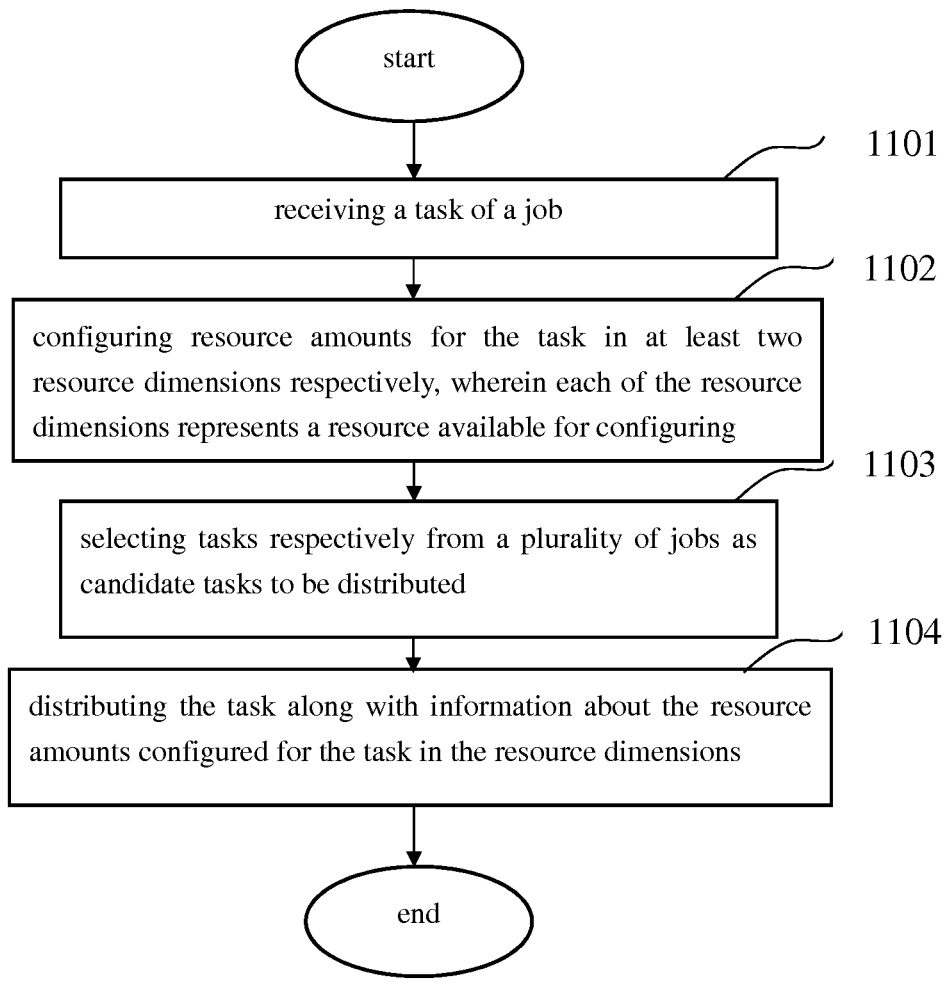
FIG. 11 shows a schematic flowchart of a method of scheduling according to a third embodiment of this invention.

FIG. 11 shows a schematic flowchart of a method of scheduling according to a third embodiment of this invention, wherein on the basis of operations 1101, 1102, 1104 corresponding to operations 301~303 of the first embodiment, the method further comprises a operation 1103 of selecting tasks respectively from a plurality of jobs as candidate tasks to be distributed.

Although in the first embodiment, it is also possible to process tasks of one job after another, in the third embodiment, tasks may be selected respectively from multiple jobs as candidate tasks to realize "fair processing" between multiple jobs, and tasks with different properties (from different jobs) may be distributed alternately to form "complementarity" in utilizing of resources, so as to further improve resource utilization.

Wherein, the locations of the configuration unit 202 and the candidate unit 205 may be exchanged. Correspondingly, the order of operations 1102 and 1103 may be exchanged too. That is, resource amounts may be configured for tasks of multiple jobs before selecting candidate tasks, or candidate tasks may be selected before configuring resource amounts for tasks.

In an embodiment, the selection may comprise, but not limited to, a round-robin selection for multiple jobs.

In an embodiment, candidate tasks may be temporarily stored in a storage area called as a "task pool" and will be distributed when the task pool is full. Upon all candidate tasks in the task pool have been distributed, the task pool may be emptied and then re-filled with new selected candidate tasks. Instead of emptying the task pool, it is also possible to add new candidate tasks into the task pool at any moment. The number of candidate tasks that can be accommodated in the task pool is preferably the same as the number of the jobs so as to further improve fairness.

<Embodiment 4>

A fourth embodiment will be described with reference to FIG. 12 and FIG. 13.

Figure 12:
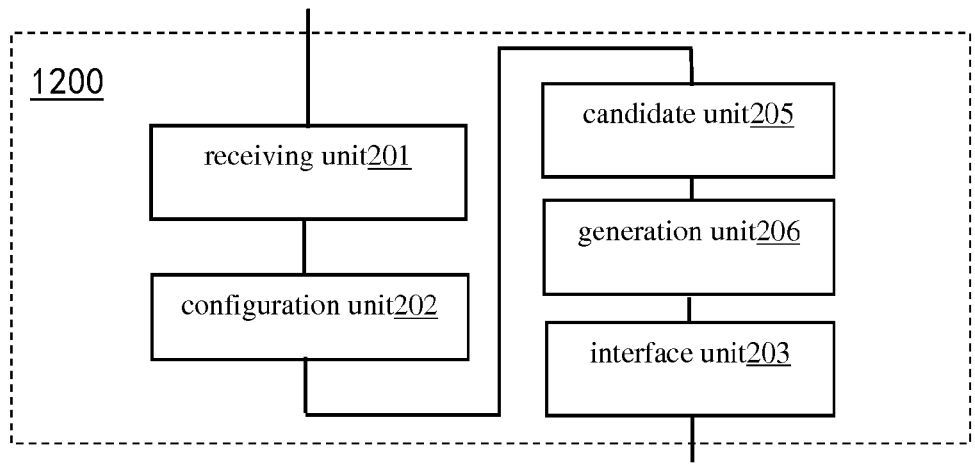
FIG. 12 shows a schematic structure diagram of an apparatus 1200 of scheduling according to a fourth embodiment of this invention.

FIG. 12 shows a schematic structure diagram of an apparatus 1200 for scheduling according to a fourth embodiment of this invention, wherein on the basis of the third embodiment, the scheduling apparatus 1200 further comprises a generation unit 206, configured to generate a scheme for distributing the candidate tasks at the interface unit 203 according to the resource amounts configured for each of the candidate tasks in the resource dimensions.

Figure 13:
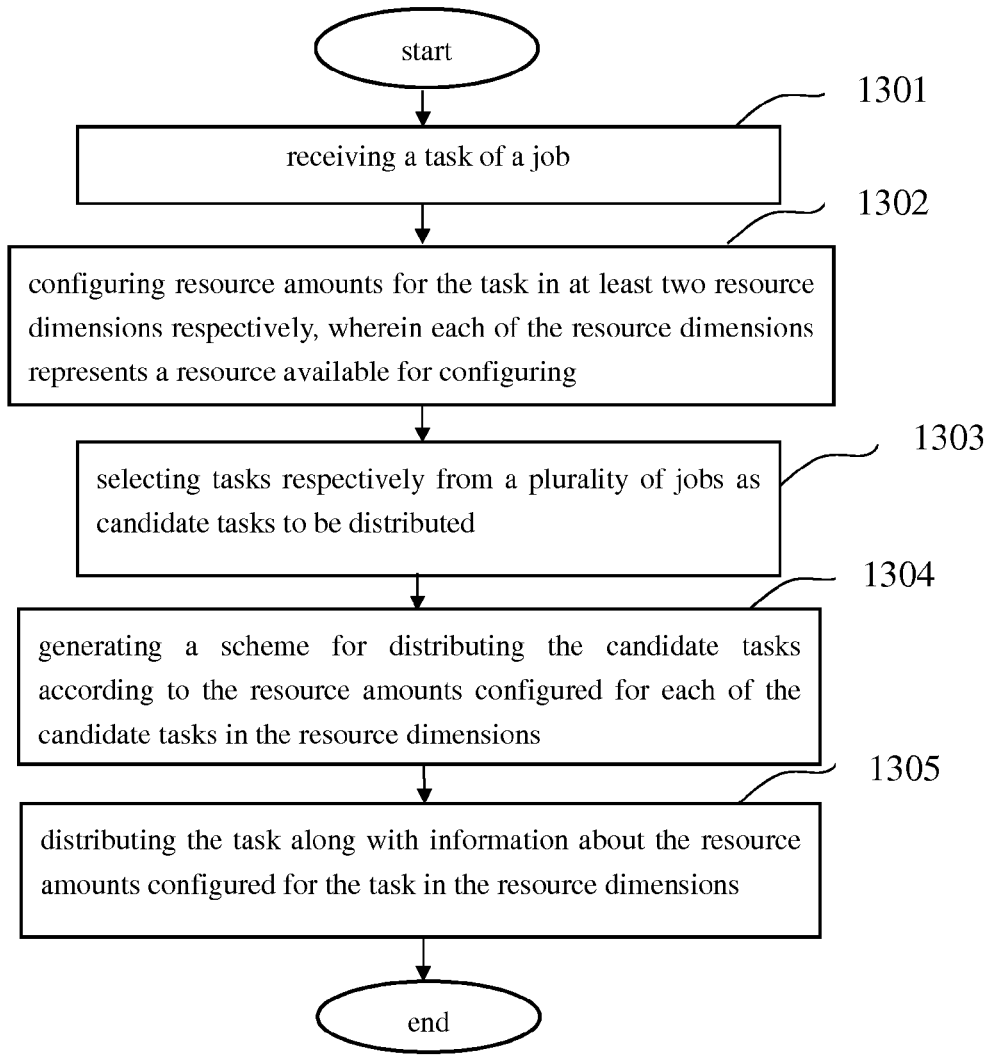
FIG. 13 shows a schematic flowchart of a method of scheduling according to a fourth embodiment of this invention.

FIG. 13 shows a schematic flowchart of a method of scheduling according to a fourth embodiment of this invention, wherein on the basis of operations 1301~1303, 1305 corresponding to operations 1101~1104 of the third embodiment, the method further comprises a operation 1304 of generating a scheme for distributing the candidate tasks according to the resource amounts configured for each of the candidate tasks in the resource dimensions.

Although distribution may be performed according to a natural order or a selection order of the candidate tasks in the third embodiment, this fourth embodiment may generate a scheme for distributing the candidate tasks according to the resource amounts configured for each of the candidate tasks in the resource dimensions, thereby an optimal distribution scheme may be obtained by better utilizing "complementarity" of the tasks (for example, some tasks may be configured with more CPU resources than others) and resource conditions on the note (for example, there may be too many idle CPU resources on a node) so as to further improve resource utilization.

In an embodiment, the principle for generating a distribution scheme may be specified in any way as required, for example, including making an even utilizing of various resources on a node, or preferring the utilizing of idle resources on a node.

In an embodiment, tasks may be scored according to the above principle, for example, higher scores may be given to tasks which will utilize the various resources on a node more evenly, or tasks inclined to utilize idle resources on a node. A distribution scheme may be generated according to the scores, for example, distributing tasks from high scores to low scores.

<Embodiment 5>

A fifth embodiment will be described with reference to FIG. 14 and FIG. 15.

Figure 14:
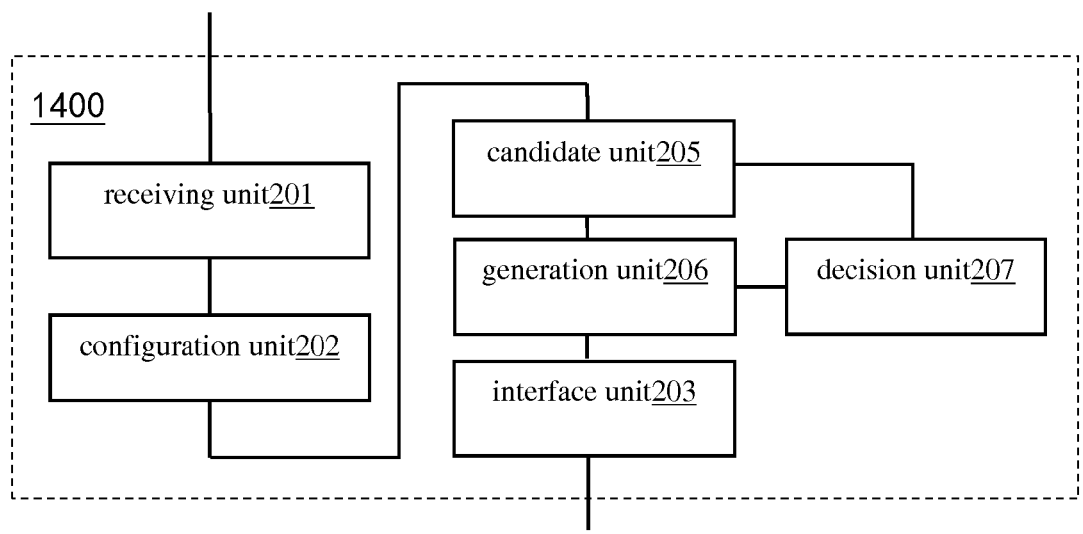
FIG. 14 shows a schematic structure diagram of an apparatus 1400 of scheduling according to a fifth embodiment of this invention.

FIG. 14 shows a schematic structure diagram of an apparatus 1400 of scheduling according to a fifth embodiment of this invention, wherein on the basis of the fourth embodiment, the scheduling apparatus 1400 further comprises a decision unit 207, configured to estimate a gain of a scheme assumed to be generated by the generation unit 206 after a predetermined lag (referred to as lagged distribution scheme) with respect to a scheme currently generated by the generation unit 206 (referred to as current distribution scheme), and in the case that the estimated gain is superior to the cost of the predetermined lag, instruct the generation unit 206 not to generate a distribution scheme until the predetermined lag elapses.

Figure 15:
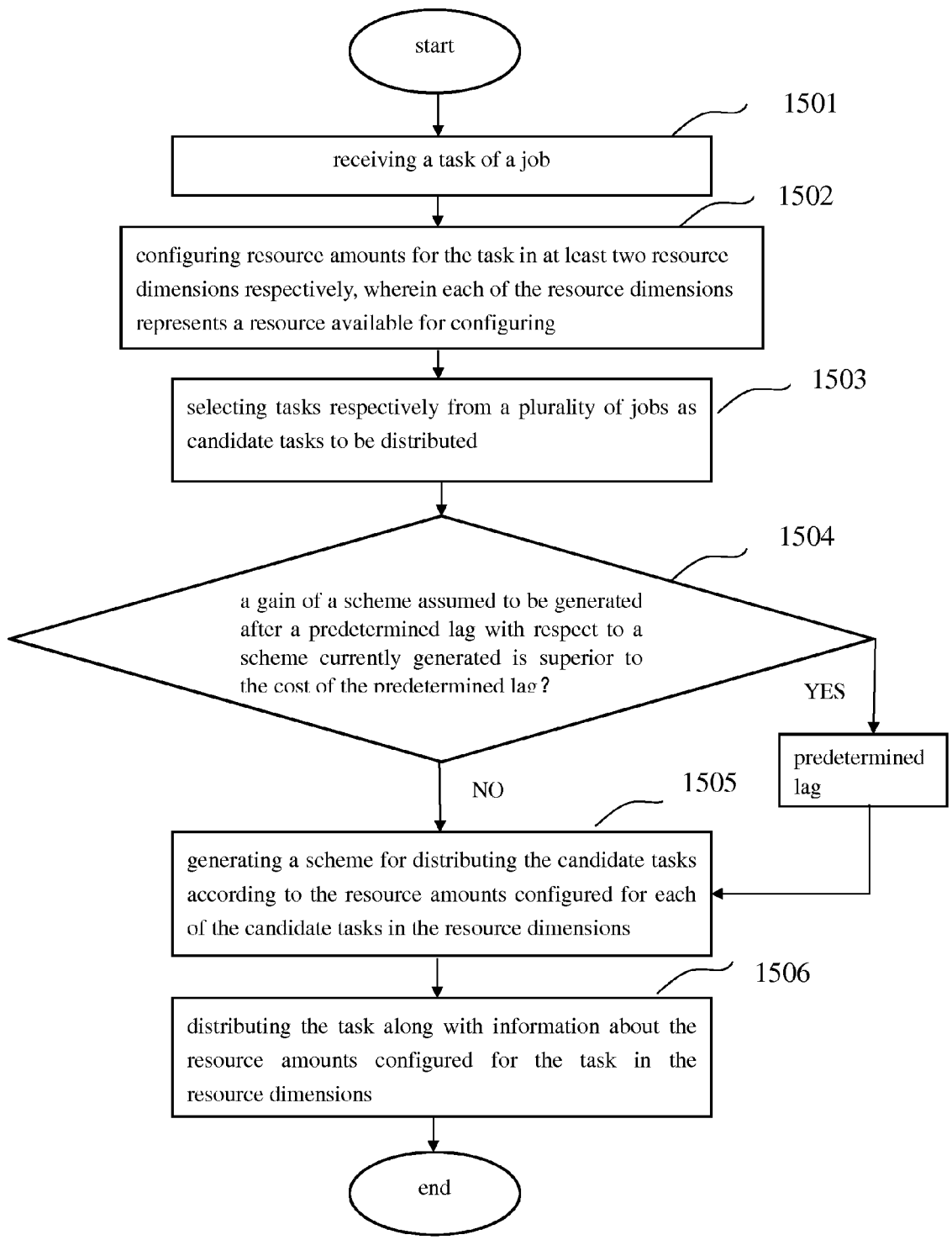
FIG. 15 shows a schematic flowchart of a method of scheduling according to a fifth embodiment of this invention.

FIG. 15 shows a schematic flowchart of a method of scheduling according to a fifth embodiment of this invention, wherein on the basis of operations 1501~4503, 1505, 1506 corresponding to operations 1301~4305 of the fourth embodiment, the method further comprises a operation 1504 of estimating a gain of a scheme assumed to be generated after a predetermined lag (referred to as lagged distribution scheme) with respect to a scheme currently generated (referred to as current distribution scheme), and in the case that the estimated gain is superior to the cost of the predetermined lag, not generating a distribution scheme until the predetermined lag elapses.

This embodiment may further improve resource utilization through "estimating whether it is worth to lag for a better distribution scheme".

In an embodiment, the predetermined lag may be, for example, the execution time of a subsequent task(s) to be completed, or a specified time, by which it may be determined how many subsequent tasks shall be assumed to be completed before generating the lagged distribution scheme.

In an embodiment, the gain may be evenness of utilizing of various resources, a degree of the utilizing of idle resources, etc. The gain may be estimated using the scores described above, for example, the gain may be estimated through comparing a task score based on the lagged distribution scheme and a task score based on the current distribution scheme.

In an embodiment, determining whether the gain is superior to the cost may comprise comparing the gain and the cost of predetermined lag based on a correspondence relationship (for example, the gain and the predetermined lag may be converted into the same measurement units for comparison), if the gain exceeds the cost of the lag, it may be considered as "it is worth to lag for a better distribution scheme" and a distribution scheme should be generated after the execution of some subsequent tasks (after the lag elapses),i.e., adopting the lagged distribution scheme; otherwise, a distribution scheme may be currently generated without the execution of subsequent tasks (i.e., adopting the current distribution scheme).

Figure 16:
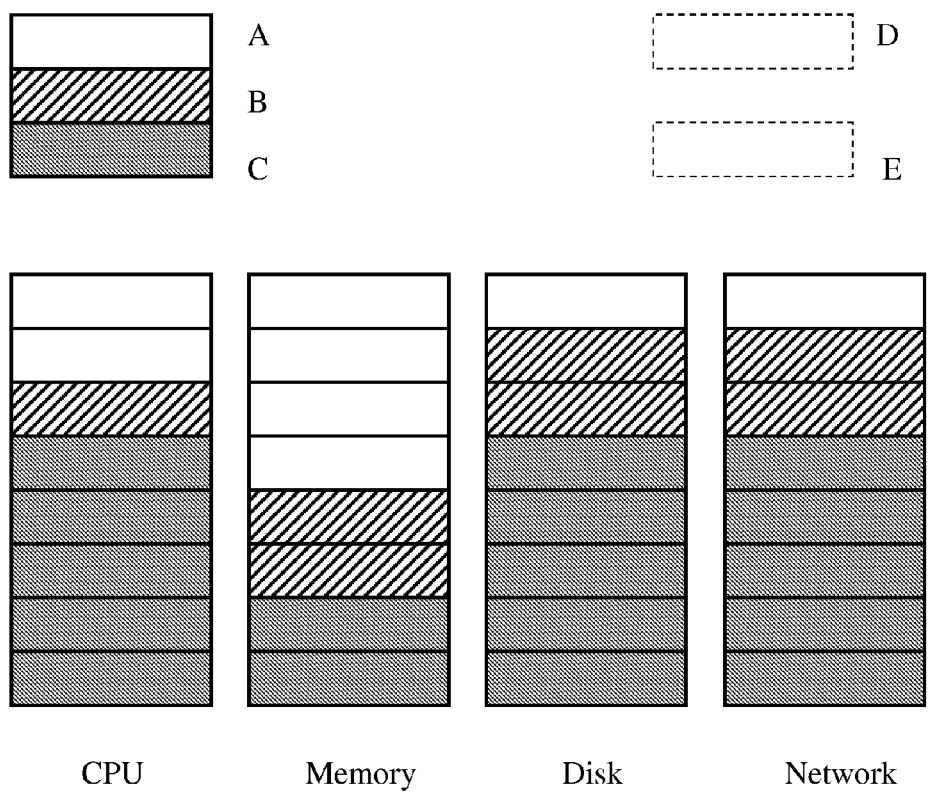
FIG. 16 shows a diagram for interpreting the principle of the decision unit 207 and the operation 1504.

FIG. 16 shows a diagram for interpreting the principle of the decision unit 207 and the operation 1504. This diagram is given for the convenience of understanding, which is illustrative but not limiting. In FIG. 16, four kinds of resources on a node available for configuration, i.e., CPU, Memory, Disk, and Network are listed as columns of blocks, each block representing a resource unit. Assume that there are five tasks A, B, C, D, E with different properties. Amounts of various resources to be configured for the tasks are represented with vector tags as below.

A{2,4,1,1}
B{1,2,2,2}
C{5,2,5,5}
D{1,2,1,1}
E{3,4,2,1}

Wherein, task A has been completed on the node, and the blank blocks represent idle resources released after the completion of task A. Task B is in execution and is about to be completed, and the striped blocks represent resources occupied by task B. Task C is in execution and will be completed after the completion of task B, and shaded blocks represent resources occupied by task C. dashed blocks represent tasks D and E which are candidate tasks to be distributed.

The execution time of task B is used as a predetermined lag. In the current state, because the idle amounts (2,4,1,1) of the four resources represented by the blank blocks are not sufficient for the execution of task E{3,4,2,1}, a current distribution scheme can only distribute task D to the node first. With such distribution, after the completion of task B, the idle amounts of the four resources on the node will be (2,4,2,2), which are still not sufficient for the execution of task E, as a result, task E has to be distributed to anther node, and resources (2,4,2,2) on this node will not be utilized sufficiently.

However, if a distribution scheme is generated after the predetermined lag, i.e., after the completion of task B, the idle amounts of the four resources will become (3,6,3,3), and a distribution scheme generated after the lag can distribute task E to the node. In this case, after the completion of task B, the idle amounts of the four resources will be (0,2,1,2).

It can be seen that the unused resources (0,2,1,2) based on the lagged distribution scheme are reduced and become evener than (2,4,2,2) based on the current distribution scheme. This reduction and evenness may be considered as a "gain" as described above. A rule may be specified as required to measure whether the gain is higher than the cost (i.e., the execution time of task B) so as to determine whether not to generate the distribution scheme until completing execution of task B.

The third to fifth embodiments are described above on the basis of the first embodiment, however, features of the third to fifth embodiments may be combined with the second embodiment as well.

<Embodiment 6>

A sixth embodiment will be described with reference to FIG. 17 and FIG. 18.

Figure 17:
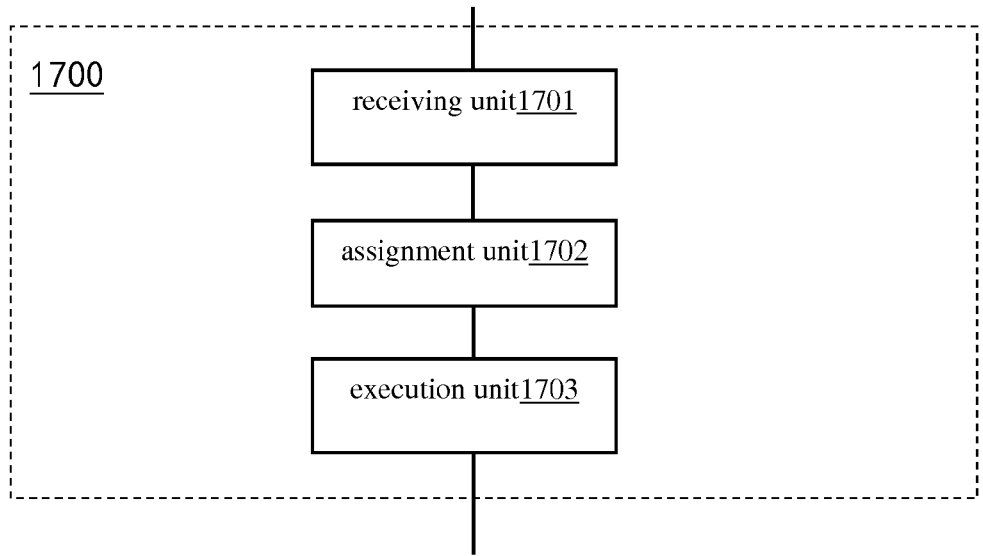
FIG. 17 shows a schematic structure diagram of an apparatus for execution according to a sixth embodiment of this invention.

FIG. 17 shows a schematic structure diagram of an apparatus 1700 for execution according to a sixth embodiment of this invention, wherein the apparatus for execution can comprise a receiving unit 1701, an assignment unit 1702, and an execution unit 1703.

The receiving unit 1701 may be configured to receive a task along with information about the resource amounts configured for the task in at least two resource dimensions respectively, wherein the information may be the vector tag described above.

The assignment unit 1702 may be configured to assign resources to the task in the at least two resource dimensions respectively according to the information.

The execution unit 1703 may be configured to execute the task by using the assigned resources.

Figure 18:
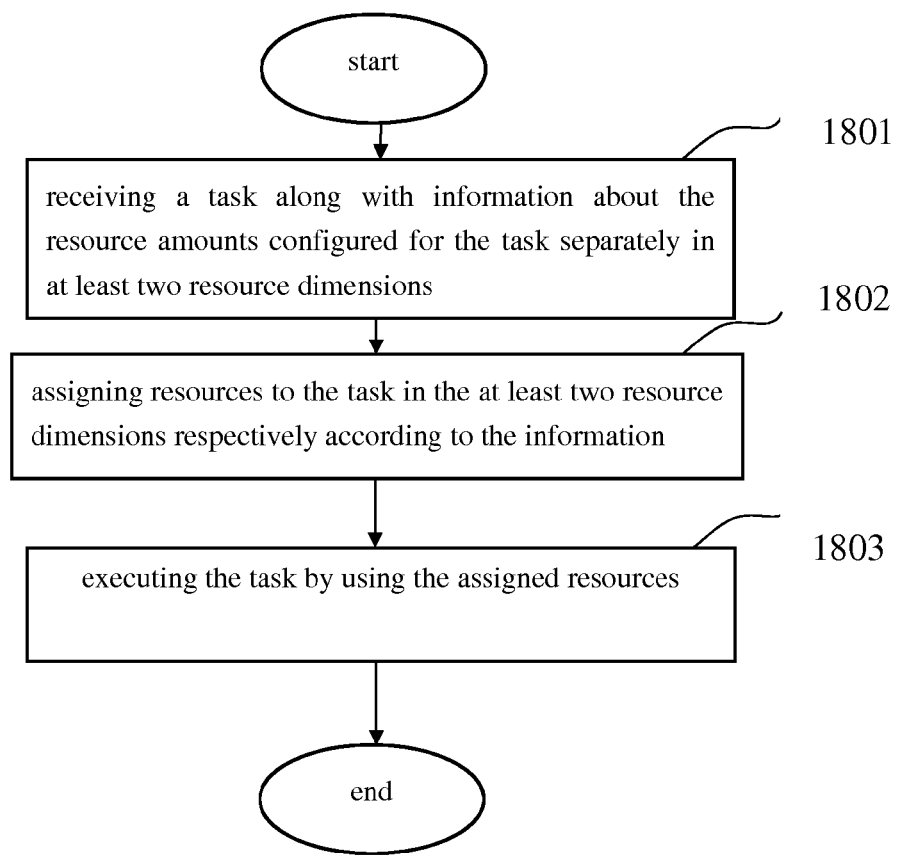
FIG. 18 shows a schematic flowchart of a method for execution according to a sixth embodiment of this invention.

FIG. 18 shows a schematic flowchart of a method for execution according to a sixth embodiment of this invention. The method for execution can comprise the following operations: an operation 1801 of receiving a task along with information about the resource amounts configured for the task in at least two resource dimensions respectively, wherein the information may be the vector tag described above; a operation 1802 of assigning resources to the task in the at least two resource dimensions respectively according to the information; and an operation 1803 of executing the task by using the assigned resources.

The apparatus and method for execution in this embodiment may assign resources to execute a task according resource amounts configured for the task in at least two resource dimensions respectively, which enables more flexible resource assignment, and thus is more suitable for the resource requirements of the task, leading to improved resource utilization accordingly.

In an embodiment, the apparatus for execution may be a node device, and the method for execution may be performed on the node device.

<Embodiment 7>

A seventh embodiment will be described with reference to FIG. 19.

Figure 19:
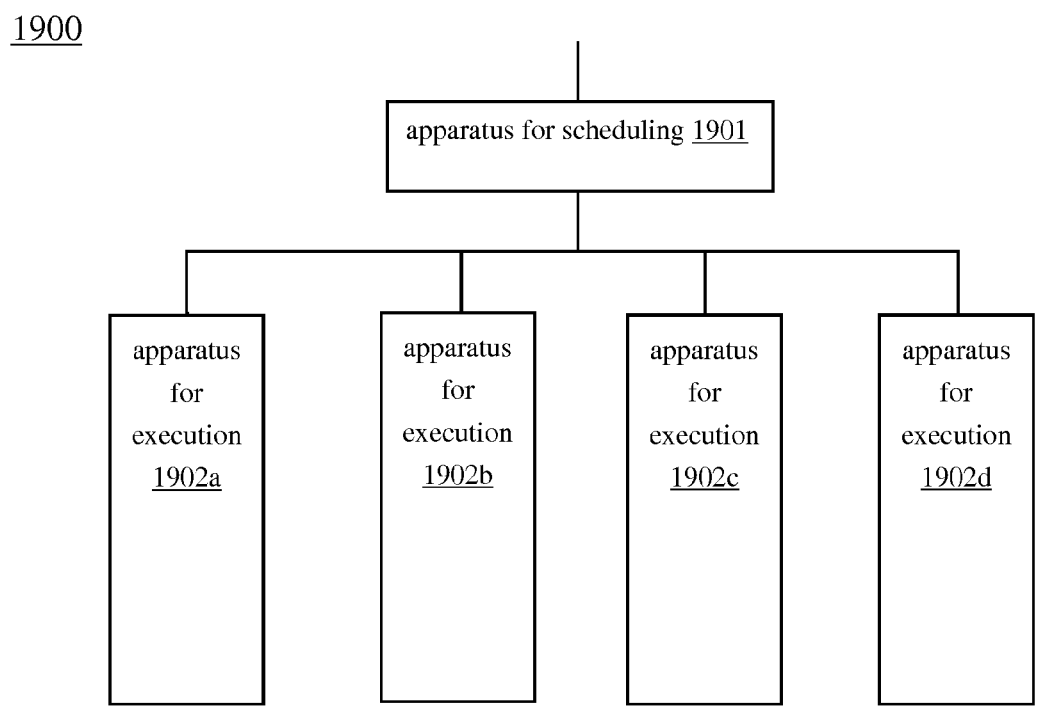
FIG. 19 shows a schematic structure diagram of a distributed system according to a seventh embodiment of this invention.

FIG. 19 shows a schematic structure diagram of a distributed system 1900 according to a seventh embodiment of this invention. the distributed system can comprise an apparatus of scheduling 1901 according to any of the first to fifth embodiments; and apparatus for execution (1902a, 1902b, 1902c, 1902d) according to the sixth embodiment, configured to execute tasks distributed by the apparatus of scheduling. The number of apparatus for execution is not limited to four as shown in FIG. 19, and may be any number.

The above and other embodiments of this invention may be applied to various distributed application scenarios, including but not limited to MapReduce. MapReduce has been known as applicable for parallel computation of large data sets, which enable applications to be executed on a distributed system through Map and Reduce processes.

Currently, both Map and Reduce processes depend on task slots in a single dimension when processing tasks, and thus leading to problem of lower resource utilization.

The apparatus for scheduling according to the first to fifth embodiments of this invention may be comprised in a Map device or a Reduce device. The method of scheduling according to the first to fifth embodiments of this invention may be comprised in a Map process or a Reduce process, so that Map task slots or Reduce task slots that are conventionally in a single dimension are modified to have at least two dimensions, and resource amounts are configured for a Map task or a Reduce task in the at least two dimensions respectively, making the resource amounts configuration more flexible and leading to higher resource utilization.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for scheduling, comprising:
a receiving unit configured to receive a task of a job;
a configuration unit configured to configure resource amounts for the task in at least two resource dimensions respectively, wherein each of the resource dimensions represents a resource available for configuring;
an interface unit configured to distribute the task along with information about the resource amounts configured for the task in the resource dimensions to available resources;
an executing unit configured to execute the task using the available resources;
a candidate unit configured to select tasks respectively from a plurality of jobs as candidate tasks to be distributed to the available resources, the receiving unit further configured to receive the candidate tasks, and the configuration unit further configured to configure resource amounts for each of the candidate tasks in at least two resource dimensions respectively, wherein each of the resource dimensions represents a resource available for configuring;
a decision unit configured to estimate both a gain and a cost of waiting to generate a scheme for distributing one or more of the candidate tasks to the available resources until after one or more currently executing tasks have completed;
a generation unit configured to generate a scheme for distributing the one or more of the candidate tasks to the available resources after the one or more currently executing tasks have completed according to the resource amounts configured for each of the one or more the candidate tasks in the resource dimensions when the estimated gain exceeds the estimated cost, the generation unit further configured to generate a scheme for distributing the one or more of the candidate tasks to the available resources while the one or more currently executing tasks are executing according to the resource amounts configured for each of the one or more candidate tasks in the resource dimensions when the estimated gain is less than or equal to the estimated cost, the interface unit further configured to distribute the one or more of the candidate tasks along with information about the resource amounts configured for the one or more of the candidate tasks to the available resources according to the generated scheme, and the executing unit further configured to execute the one or more of the candidate tasks using the available resources.

2. The apparatus according to claim 1, further comprising: an estimation unit, configured to estimate the resources amounts resource amounts to be consumed by the task in the at least two resource dimensions, wherein the configuration unit configures the resource amounts for the task in at least two resource dimensions respectively according to result of the estimating.

3. The apparatus according to claim 2, wherein the estimation unit estimates the resources amounts resource amounts to be consumed by the task in the at least two resource dimensions according to historical information.

4. The apparatus according to claim 2, wherein the estimation unit estimates the resources amounts resource amounts to be consumed by the task in the at least two resource dimensions according to sampled information.

5. The apparatus according to claim 1, wherein the apparatus of scheduling is included in a Map device of a MapReduce device.

6. The apparatus according to claim 1, wherein the apparatus of scheduling is included in a Reduce device of a MapReduce device.

* * * * *